(12) United States Patent
Amamori (10) Patent No.: US 6,168,203 B1
(45) Date of Patent: Jan. 2, 2001

(54) AIRBAG

(75) Inventor: Ichiro Amamori, Tokyo (JP)

(73) Assignee: Takata Corporation, Tokyo (JP)

( * ) Notice: Under 35 U.S.C. 154(b), the term of this patent shall be extended for 0 days.

(21) Appl. No.: 09/301,611

(22) Filed: Apr. 29, 1999

(30) Foreign Application Priority Data

| May 8, 1998 | (JP) | 10-126067 |
| Apr. 16, 1999 | (JP) | 11-109582 |

(51) Int. Cl.[7] .................................................. B60R 21/16
(52) U.S. Cl. ...................................... 280/743.1; 280/728.1
(58) Field of Search .............................. 280/743.1, 728.1

(56) References Cited

U.S. PATENT DOCUMENTS

| 3,810,654 | * | 5/1974 | DeBano, Jr. et al. | 280/728.1 |
| 5,316,337 | * | 5/1994 | Yamaji et al. | 280/743.1 |
| 5,529,340 | * | 6/1996 | Fairbanks | 280/743.1 |
| 6,019,390 | * | 2/2000 | Keshavaraj | 280/743.1 |

* cited by examiner

*Primary Examiner*—Lanna Mai
*Assistant Examiner*—Lynda Jasmin
(74) *Attorney, Agent, or Firm*—Kanesaka & Takeuchi (57) ABSTRACT

An airbag which is easily sewn up and which is capable of providing a large extent of thickness when inflated is formed of two pieces of panels A, B. The panels A, B are superposed on each other and sewn by a seam along sides 1, 2, 3, 11, 12, and 13 so as to make an envelope. Sides 4*a*, 4*b* are sewn by a seam 30. The open edges other than the sewn edges of the envelope are sequentially sewn by seams 50 and 60.

4 Claims, 15 Drawing Sheets

AIRBAG

BACKGROUND OF THE INVENTION AND RELATED ART STATEMENT

The present invention relates to an airbag of an airbag apparatus which is installed in a vehicle including an automobile and, more particularly, relates to an airbag which is preferable for a passenger's seat.

A conventional airbag having a drum shape for a front passenger's seat consists of three panels. Another airbag consisting of two panels is also known.

The former comprises three panels which are a pair of end panels and one drum panel. The end panels constitute portions corresponding to both drum ends of a drum shape and the drum panel constitutes a portion corresponding to a body-shell of the drum shape. Although this airbag provides a large extent of thickness (the length along a direction from a vehicle occupant to an instrument panel) when inflated, it takes long time to sew up the airbag because it is sewn in three dimensions.

On the other hand, the airbag comprising two panels which are sewn to each other along their peripheries can be easily sewn because it is sewn in two dimensions, but provides a less extent of airbag thickness when inflated.

OBJECT AND SUMMARY OF THE INVENTION

It is an object of the present invention to provide an airbag which can be easily sewn and is capable of providing a large extent of thickness when inflated.

An airbag of a first aspect of the present invention comprises two schematically trapezoidal panels A and B for first and second trapezoidal panels which are sewn together. The panel A includes a side 2 corresponding to a top of a trapezoid, a side 4 corresponding to the base of the trapezoid, and sides 1 and 3 corresponding to the oblique sides of the trapezoid, and has a rectangular recess 5 formed in the middle of the side 4 and protrusions 6a, 6b protruding from portions of the sides 1, 3 near the side 4. The panel B includes a side 12 corresponding to the top of the trapezoid, a side 14 corresponding to the base of the trapezoid, and sides 11, 13 corresponding to the oblique sides of the trapezoid, and a rectangular protrusion 15 protruding from the middle of the side 14. The protrusions 6a, 6b have lateral sides 7a, 7b continuously connected to the sides 1, 3. The side 4 of the panel A has sides 4a, 4b on both sides of the rectangular recess 5. The rectangular recess 5 has sides 51, 53 continuously connected to the sides 4a, 4b, and a side 52 connecting the sides 51 and 53. The side 14 of the panel B has sides 14a, 14b between the both lateral sides 15a, 15b of the protrusion 15 and the sides 11, 13, respectively. The panels A, B are sewn together along the sides 1, 11, along the sides 2, 12, and along the sides 3, 13 by a seam 20. Portions along the sides 4a, 4b of the panel A are sewn to each other by a seam 30 and edges of the protrusions 6a, 6b of the panel A and an edge of the protrusion 15 of the panel B are sewn to each other by a seam 40. Portions along the side 7a of the panel A and the side 15a and a portion along the side 14a of the panel B are sewn to each other by a seam 50 and portions along the side 7b of the panel A and the side 15b and a portion along the side 14b of the panel B are sewn to each other by a seam 50. Portions along the sides 51, 53 and a portion along the side 52 of the rectangular recess 5 of the panel A are sewn to each other by a seam 60.

The following process can be taken as an example to sew up the airbag of the first aspect.

The panels A, B are superposed on each other and then sewn together along the sides 1, 2, 3, 11, 12, and 13 by the seam 20 so as to make an envelope body. The envelope body is reversed inside out. The sides 4a, 4b of the panel A are superposed on each other and portions along the sides 4a, 4b of the panel A are sewn to each other by the seam 30. The protrusions 6a, 6b of the panel A are superposed on the protrusion 15 of the panel B and are sewn up by the seam 40. After the sides 7a, 15a are straightened, they are superposed on the side 14a of the panel B and sewn by the seam 50. After the sides 7b, 15b are straightened, they are superposed on the side 14b of the panel B and sewn by the seam 50. The sides 51, 53 of the rectangular recess 5 of the panel A are straightened and they are superposed on the side 52 and sewn by the seam 60. It should be noted that the aforementioned sewing process is just an example and modifications can be taken. The envelope body may not be reversed inside out.

An airbag of a second aspect of the present invention comprises two schematically trapezoidal panels A' and B which are sewn together. The panel A' includes a side 2 corresponding to a top of a trapezoid, a side 4 corresponding to the base of the trapezoid, and sides 1 and 3 corresponding to the oblique sides of the trapezoid, and has a rectangular recess 5 formed in the middle of the side 4. The panel B includes a side 12 corresponding to the top of the trapezoid, a side 14 corresponding to the base of the trapezoid, and includes sides 11, 13 corresponding to the oblique sides of the trapezoid, and a rectangular protrusion 15 protruding from the middle of the side 14. The protrusion 15 has sides 15a, 15b continuously connected to the side 14 and a side 15c connecting the sides 15a and 15b. The side 1 of the panel A' consists of a side 1f superposed on the side 11 of the panel B and a side 1r lengthened from the side 1f. The side 3 of the panel A' consists of a side 3f superposed on the side 13 of the panel B and a side 3r lengthened from the side 3f. The side 4 of the panel A' has sides 4a, 4b on both sides of the rectangular recess 5. The rectangular recess 5 has sides 51, 53 continuously connected to the sides 4a, 4b, and a side 52 connecting the sides 51 and 53. The side 14 of the panel B has sides 14a, 14b between the both lateral sides 15a, 15b of the protrusion 15 and the sides 11, 13, respectively. The panels A', B are sewn together along the sides 1f, 11, along the sides 2, 12, and along the sides 3f, 13 by a seam 20. Portions along the sides 4a, 4b of the panel A' are sewn to each other by a seam 30 and a portion along the side 15a of the panel A' and a portion along the side 14a of the panel B are sewn to each other by a seam 58. A portion along the side 15b of the panel A' and a portion along the side 14b of the panel B are sewn to each other by a seam 58 and portions along the sides 1r, 3r of the panel A' and a portion along the side 15c of the panel B are sewn to each other by a seam 48. Portions along the sides 51, 53 and a portion along the side 52 of the rectangular recess 5 of the panel A' are sewn to each other by a seam 60.

The following process can be taken as an example to sew up the airbag of the second aspect.

The panels A', B are superposed on each other and then sewn together along the sides 1f, 2, 3f, 11, 12, and 13 by the seam 20 so as to make an envelope body. The sides 4a, 4b of the panel A' are superposed on each other and portions along the sides 4a, 4b of the panel A' are sewn to each other by the seam 30. The sides 1r, 3r of the panel A' are superposed on the side 15c of the protrusion 15 of the panel B and are sewn up by the seam 48. The sides 14a and 15a of the panel B are superposed on each other and are sewn up by the seam 58. The sides 14b and 15b of the panel B are superposed on each other and sewn up by the seam 58. The sides 51, 53 of the rectangular recess 5 of the panel A' are straightened and they are superposed on the side 52 and sewn by the seam 60. It should be noted that the aforementioned sewing process is just an example and modifications can be taken.

DETAILED DESCRIPTION OF THE PREFERRED EMBODIMENTS

Hereinafter, embodiments of an airbag of the first aspect of the present invention will be described with reference to FIGS. 1 through 10.

Figures 1A, 1D:
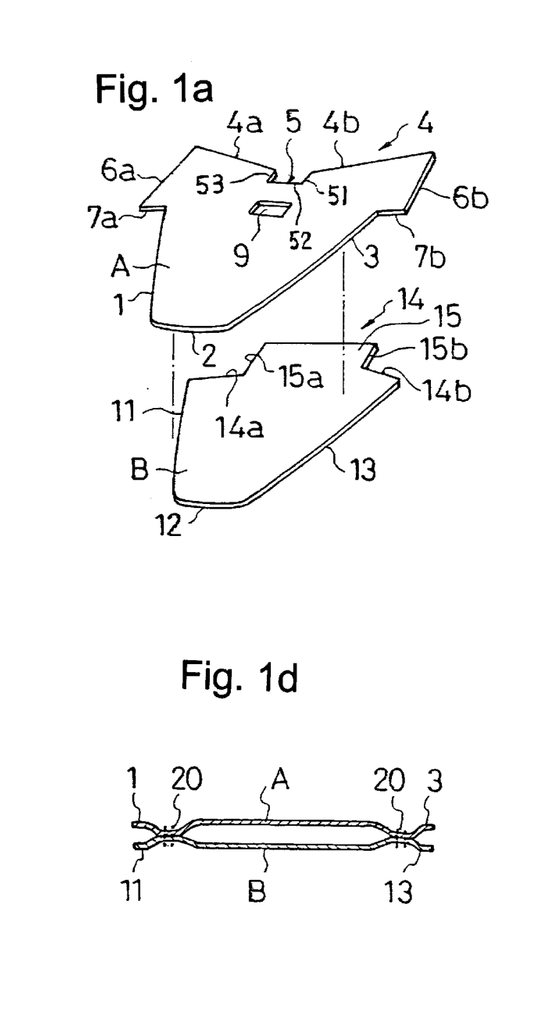
FIGS. 1a through 1f are views illustrating a process of sewing an airbag according to a first embodiment.
Figure 1B:
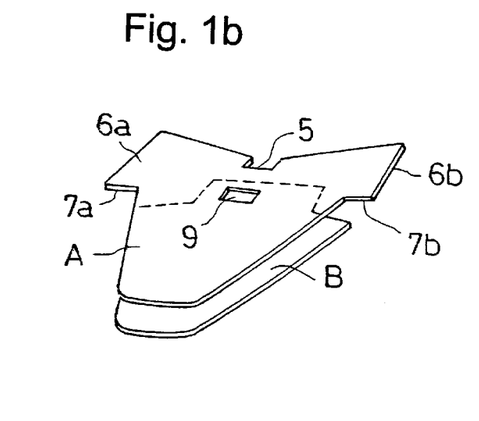

Two panels A and B are cut out of a foundation cloth. The panels A and B are superposed on each other, as shown in FIGS. 1a and 1b. The panel A is formed in a schematically trapezoidal configuration having four sides 1, 2, 3, and 4. The side 4 corresponding to the base of the trapezoid is formed in a V-like configuration and is provided with a rectangular recess 5 in the middle thereof. The side 4 of the panel A includes sides 4a, 4b on both sides of the rectangular recess 5. The rectangular recess 5 includes sides 51, 53 continuously connected to the sides 4a, 4b and also includes a side 52 connecting the sides 51, 53.

As for the sides 1, 3 corresponding to the oblique sides of the trapezoid, protrusions 6a, 6b protrude from portions of the sides 1, 3 near the side 4, respectively. Numerals 7a, 7b designate lateral sides of these protrusions 6a, 6b. These sides 7a, 7b continue to the sides 1, 3. The side 2 is positioned to correspond to the top of the trapezoid.

The panel A is provided with a gas inlet 9 formed therein.

The panel B is formed in a schematically trapezoidal configuration having four sides 11, 12, 13, and 14. The side 14 corresponding to the base of the trapezoid includes a protrusion 15 protruding therefrom. Numerals 15a, 15b designate lateral sides continuously connected to the side 14 of the protrusion 15. A side 15c lies and extends between the sides 15a and 15b. Numerals 14a, 14b designate portions of the side 14 positioned on both sides of the protrusion 15.

Figure 1C:
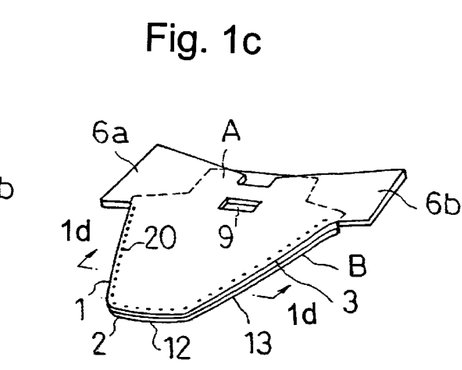

After superposing these panels A, B on each other along the sides 1 and 11, the sides 2 and 12, and the sides 3 and 13 each to each, the panels A, B are sewn up along the sides 1, 2, 3 and 11, 12, 13, as shown in FIGS. 1c and 1d. A numeral 20 designates a seam of the sewing. FIG. 1d is a sectional view taken along a line 1d—1d in FIG. 1c.

Figure 1E:
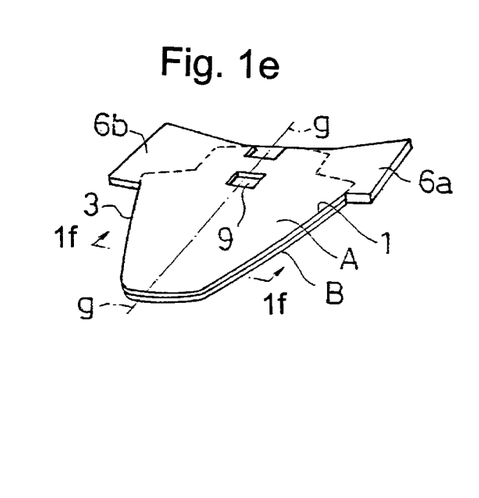
Figure 1F:
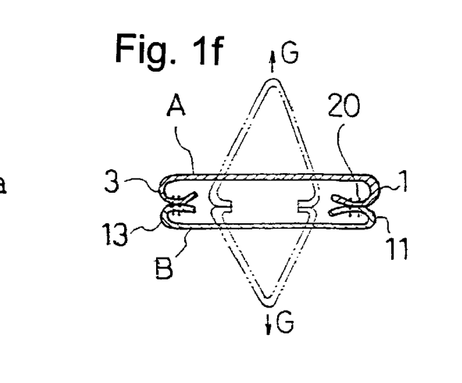

As shown in FIGS. 1e and 1f, a sewn envelope body which is made by sewing up the panels A, B as mentioned above is reversed inside out so that the inner surface of the body becomes the outer surface thereof. Accordingly, the seam 20 is hidden inside the envelope. FIG. 1f is a sectional view taken along a line 1f—1f in FIG. 1e.

Then, the panels A, B of this sewn body are pulled in the directions of arrows G, G in FIG. 1f.

Figure 2A:
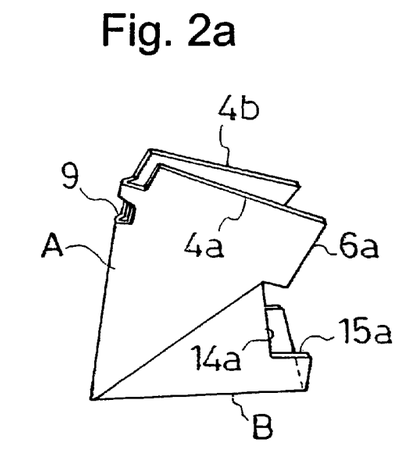
FIGS. 2a through 2f are views illustrating the process of sewing the airbag according to the first embodiment.
Figure 2B:
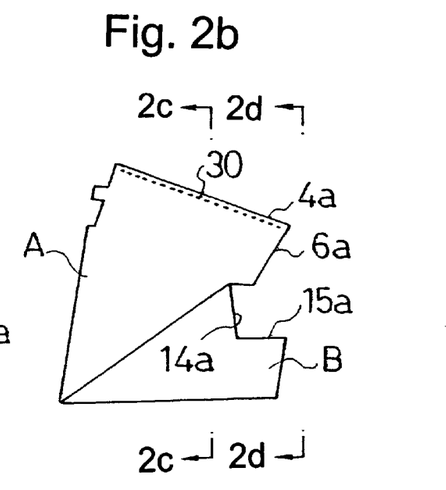
Figure 2C:
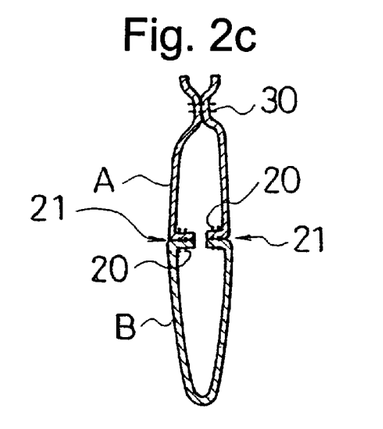
Figure 2D:
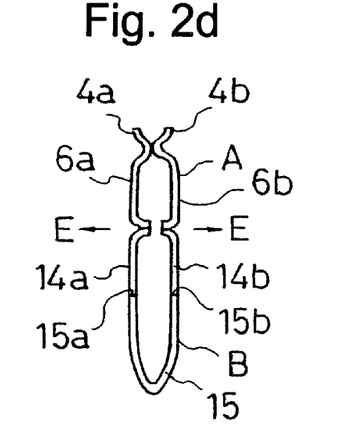
Figure 2E:
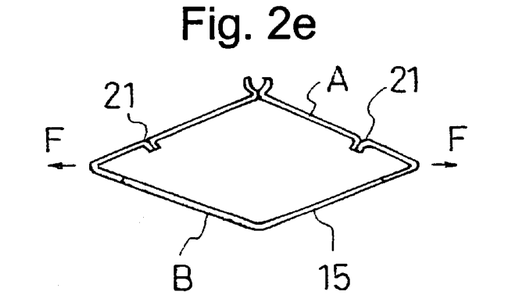
Figure 3:
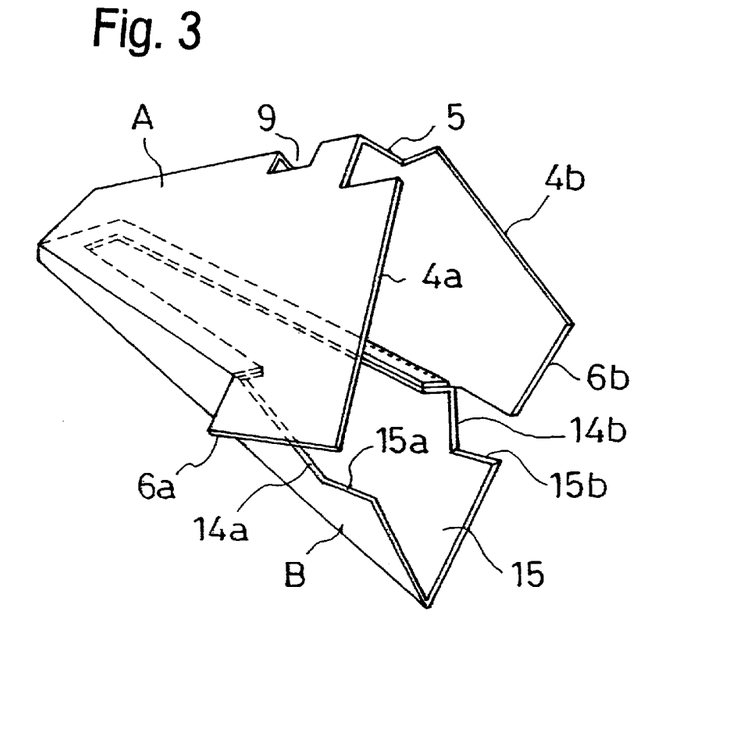
FIG. 3 is a view illustrating the process of sewing the airbag according to the first embodiment.
Figure 4:
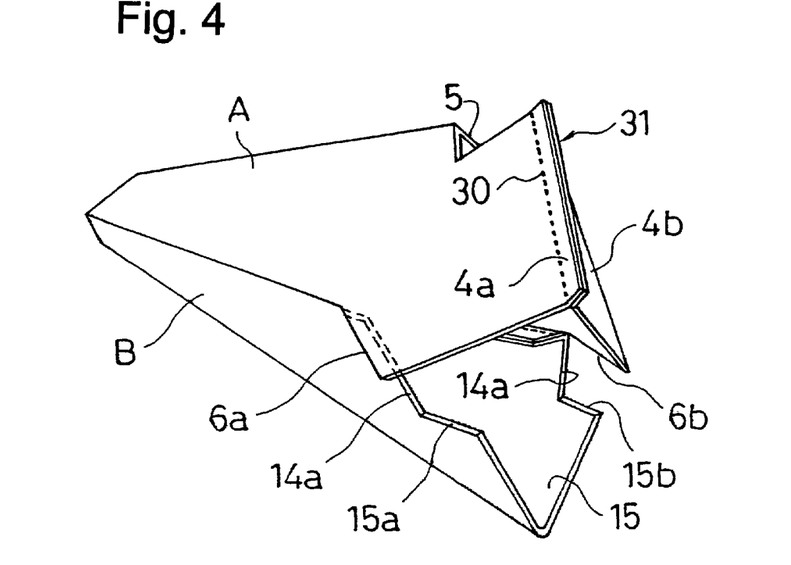
FIG. 4 is a view illustrating the process of sewing the airbag according to the first embodiment.

Accordingly, the panel A is folded in two along the center line g thereof in FIG. e, and the sides 4a, 4b are superposed on each other as shown in FIG. 2a and FIG. 3. The panel B is also folded in two in the same manner along the center line g thereof. Accordingly, the protrusion 15 is also folded in two so that the sides 15a, 15b are superposed on each other and the sides 14a, 14b are also superposed on each other. In this state, portions along the sides 4a, 4b of the panel A are sewn to each other as shown in FIG. 2b and FIG. 4. A numeral 30 designates a seam along the sides 4a, 4b. FIGS. 2c and 2d are a sectional view taken along a line 2c—2c and a view taken along a line 2d—2d respectively.

As shown in FIG. 2c, a sewn portion 21 by the seam 20 is disposed inside the sewn body.

After that, the panels A, B of this sewn envelope body are pulled in the directions of arrows E, E in FIG. 2d. After the body becomes in a state shown in FIG. 2e, it is further pulled in the direction of arrows F, F in FIG. 2e so as to become in the state shown in FIG. 2f and FIG. 5.

Figure 2F:
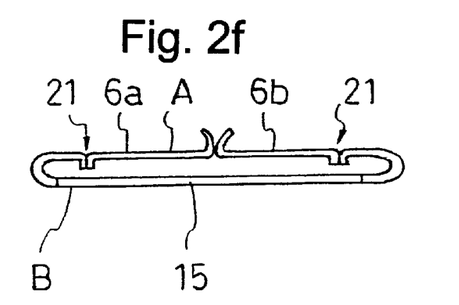
Figure 5:
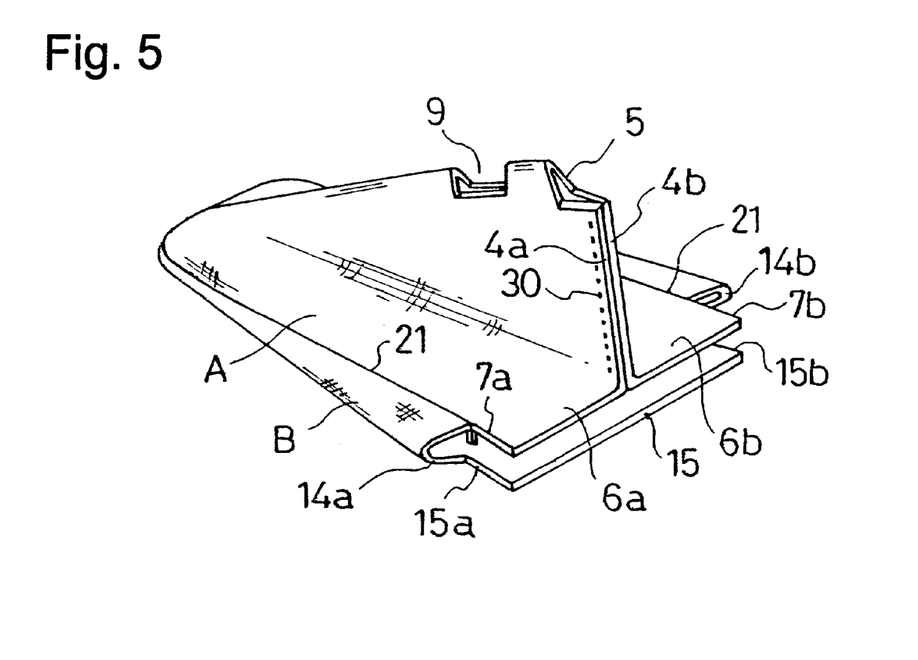
FIG. 5 is a view illustrating the process of sewing the airbag according to the first embodiment.

Referring to FIG. 2f and FIG. 5, the protrusions 6a, 6b are superposed on the protrusion 15 so that the side 7a and the side 15a, the side 7b and the side 15b are also superposed on each to each. Each side 14a, 14b is in the state folded in two. The sewn portion 21 by the seam 20 is positioned on a line extending from the sides 7a, 7b.

In the state shown in FIG. 2f and FIG. 5, the protrusions 6a, 6b are sewn to the protrusion 15 along their edges,. A numeral 40 designates a seam of the sewing. FIG. 7a is an enlarged view of a portion VII in FIG. 6.

Figure 7A:
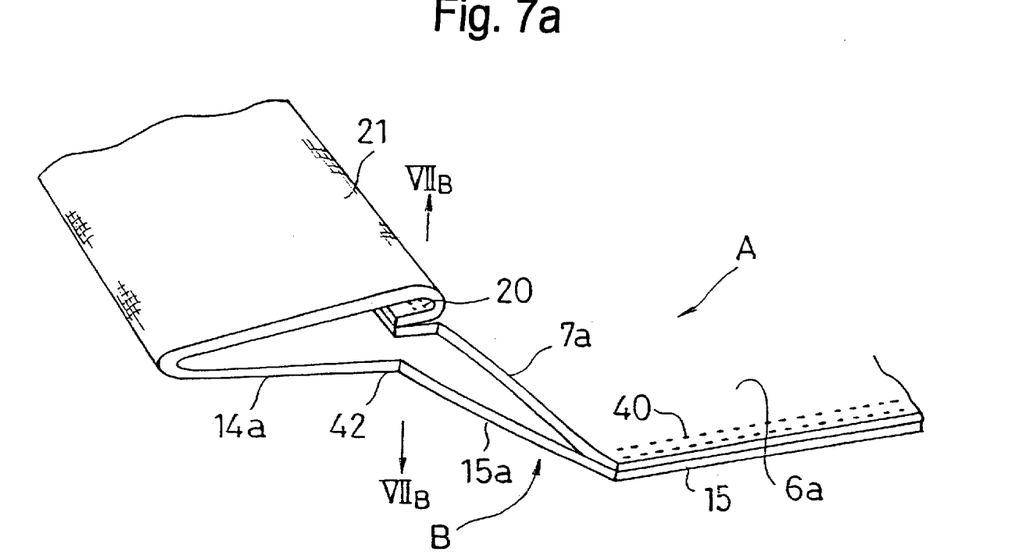
FIGS. 7a through 7c are views illustrating the process of sewing the airbag according to the first embodiment.
Figure 7B:
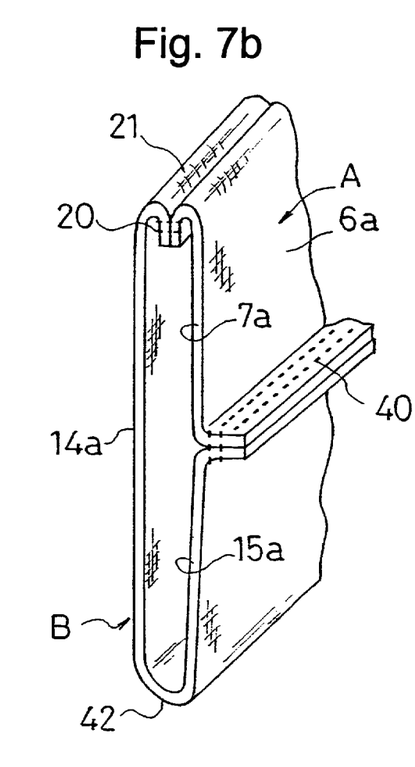
Figure 7C:
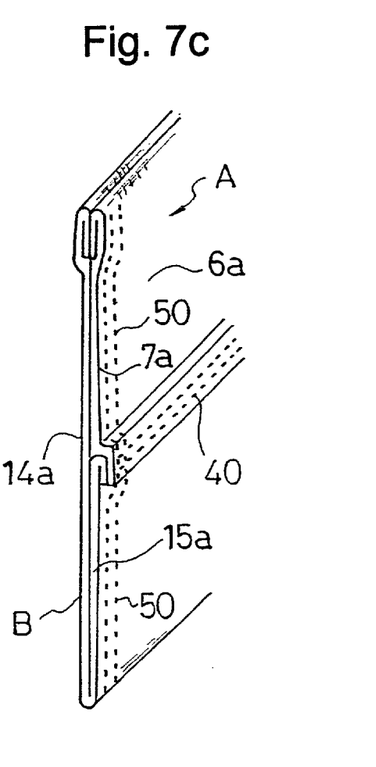

Then, the sewn portion 21 and a portion 42 of the panel B which confronts the sewn portion 21 are pulled in the direction of arrows $VII_B$, $VII_B$ in FIG. 7a. Accordingly, as shown in FIG. 7b, the side 14a is straightened and the sides 7a, 15a are also straightened whereby the sides 7a, 15a are superposed on the side 14a. Then, the panels are sewn along the side 14a and the sides 7a, 15a as shown in FIG. 7c. A numeral 50 designates a seam of this sewing.

Figure 6:
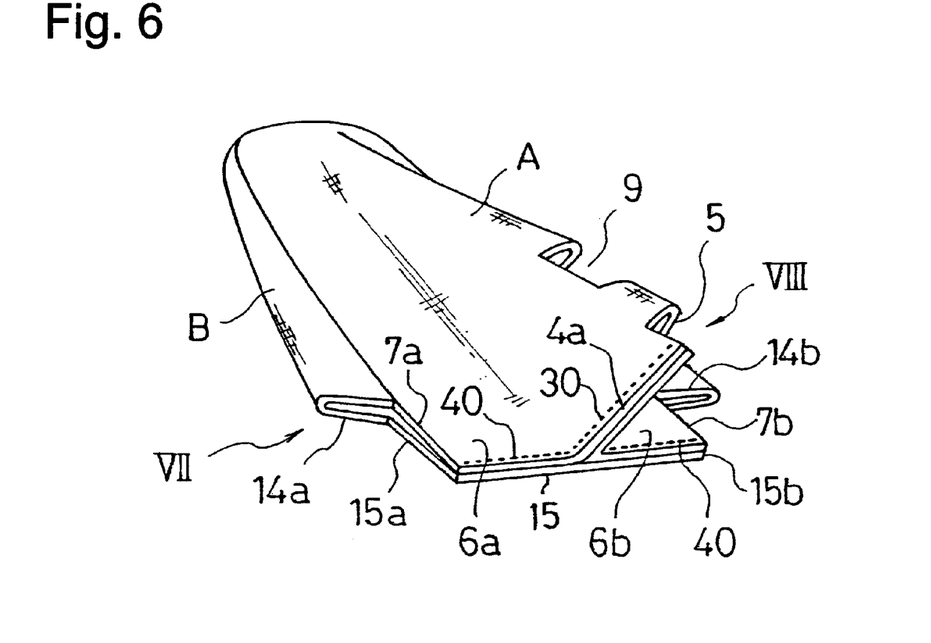
FIG. 6 is a view illustrating the process of sewing the airbag according to the first embodiment.

Though it is not shown, the sides 7b, 15b, and 14b on the right-hand side of FIG. 6 are also sewn in the same manner.

Figure 8A:
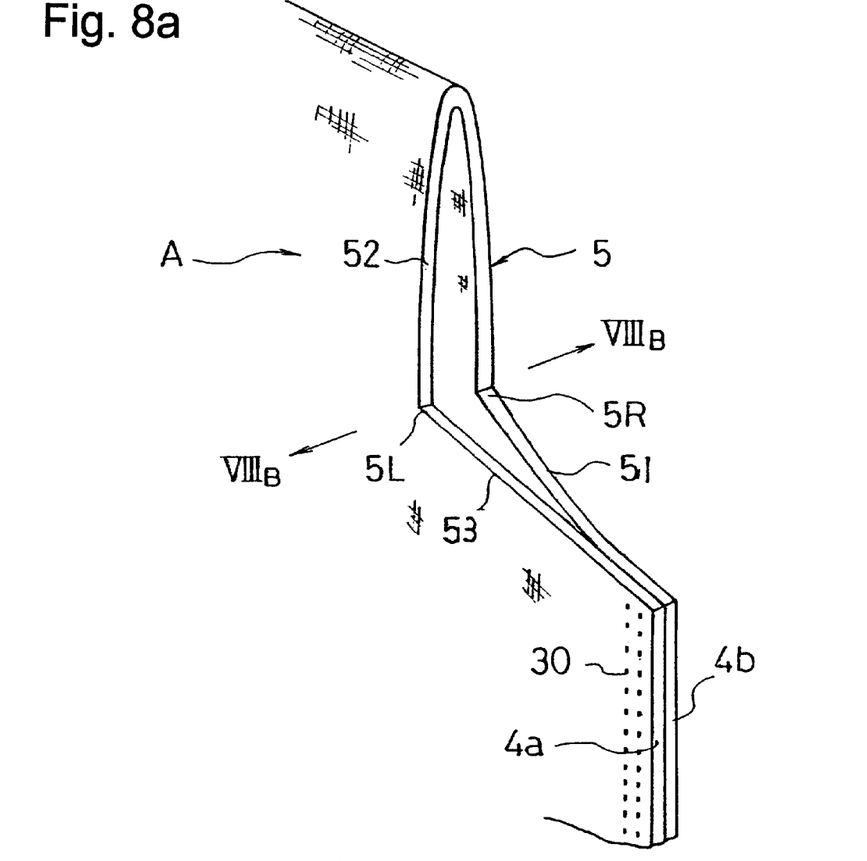
FIGS. 8a and 8b are views illustrating the process of sewing the airbag according to the first embodiment.
Figure 8B:
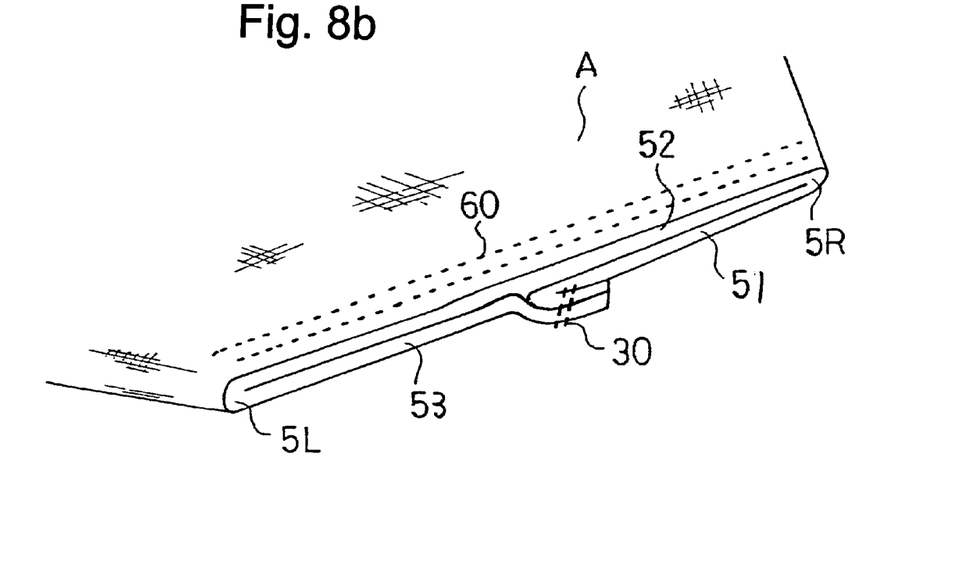

In the state just after sewing by the seam 50, the sides 51, 53 of the rectangular recess 5 are superposed on each other and the side 52 is folded in two as shown in FIG. 8a which is an enlarged view of a portion VIII in FIG. 6. Left and right corners 5L, 5R where the sides 51, 53 intersect the side 52, respectively are pulled in the directions of arrows VIII$_B$, VIII$_B$. Accordingly, as shown in FIG. 8b, the side 52 is straightened and the sides 51, 53 are also straightened. Then, the panel A is sewn along these sides 51, 52 and 53. A numeral 60 designates a seam of the sewing.

Figure 9:
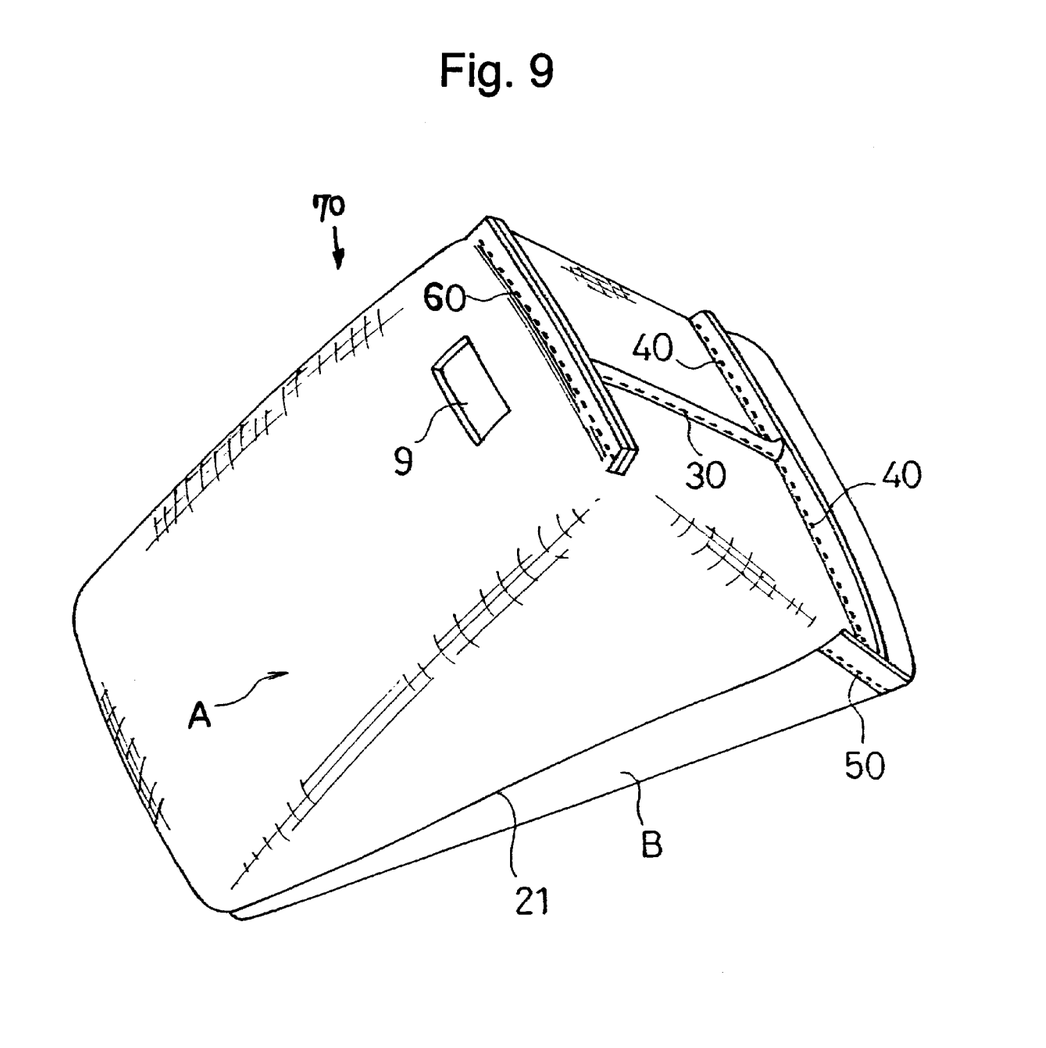
FIG. 9 is a perspective view of the sewn airbag.

In this way, an airbag 70 is completed as shown in FIG. 9.

Because this airbag 70 comprises only two pieces of panels A, B, and each of the sewn portions can be finished by the straight stitches, sewing work is easy. This airbag 70 provides a large extent of thickness when inflated, such as obviously shown in FIG. 9.

Figure 10:
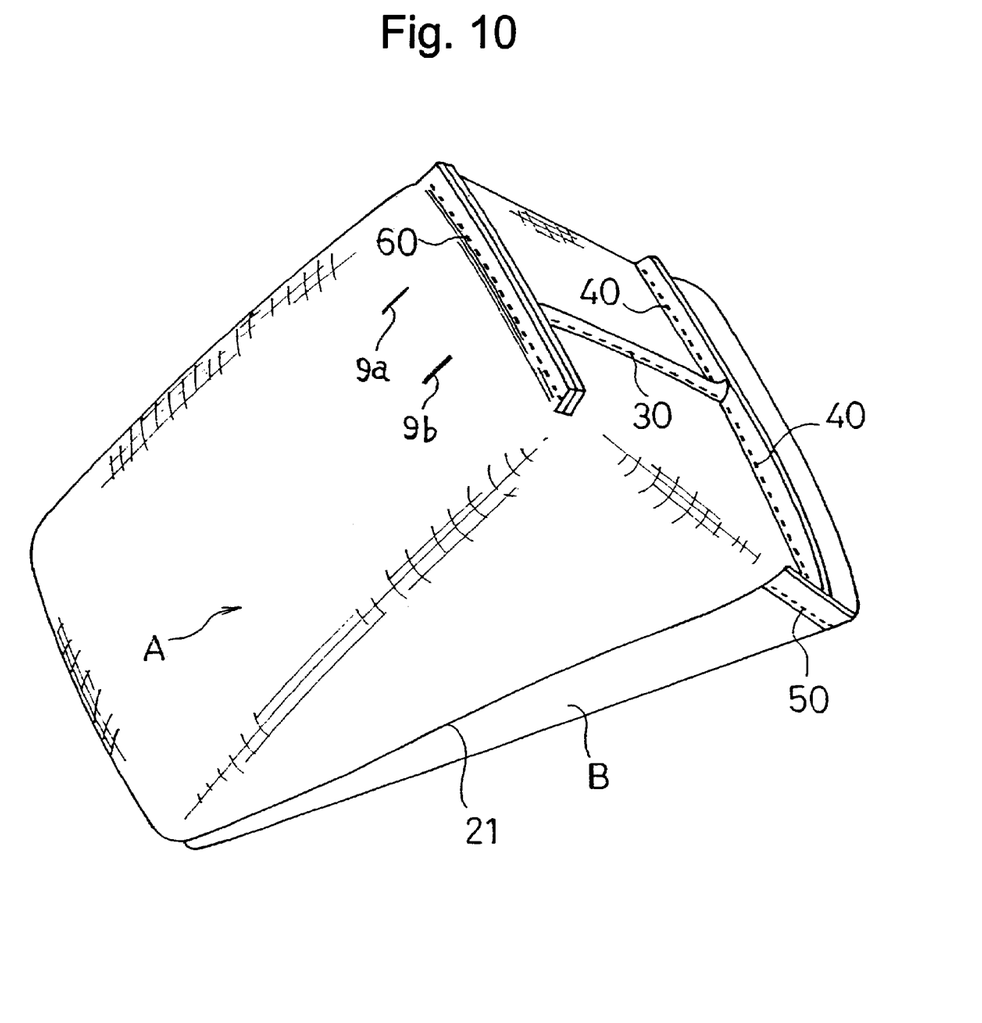
FIG. 10 is a perspective view of the sewn airbag.

Although the inlet 9 for introducing gas is provided in this embodiment mentioned above, a pair of parallel slits 9a, 9b may be provided as shown in FIG. 10. By inserting a rod-shaped inflator in these slits 9a, 9b, the airbag can be connected to the inflator.

Hereinafter, embodiment of an airbag of the second aspect of the present invention will be described with reference to FIGS. 11 through 19.

Figure 11A:
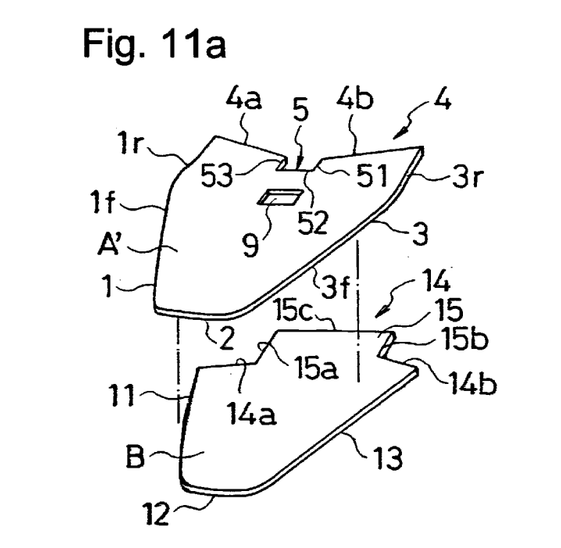
FIGS. 11a through 11d are views illustrating a process of sewing an airbag according to a second embodiment.

A panel A' used in this embodiment has the same shape as the panel A of the first embodiment except that the protrusions 6a, 6b are not provided thereto. The sides 1, 3 consist of front sides 1f, 3f and rear sides 1r, 3r respectively. The sides 1f, 3f have almost the same lengths as the sides 11, 13. The other constituents of the panel A' are identical to those of the panel A mentioned above and the same numerals correspond to the same portions.

Figure 11B:
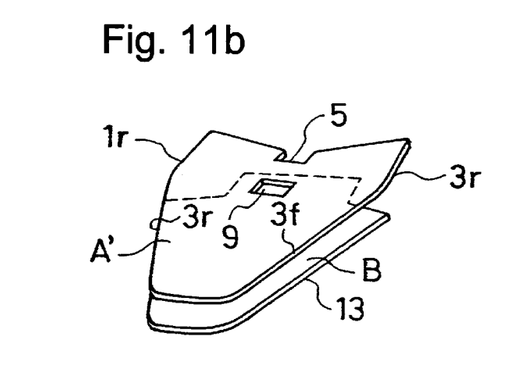

A panel B appearing in this embodiment is completely the same as the panel B of the above embodiment.

Figure 11C:
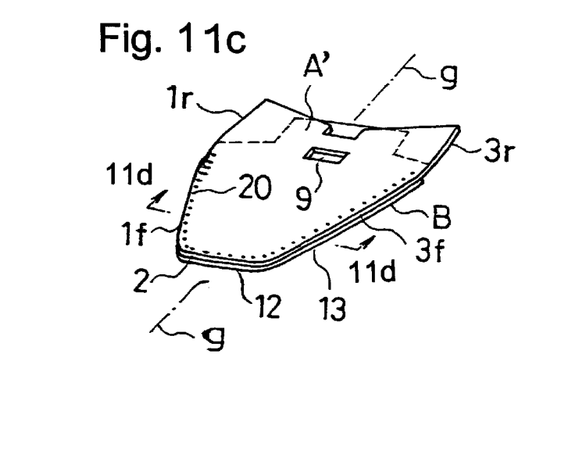
Figure 11D:
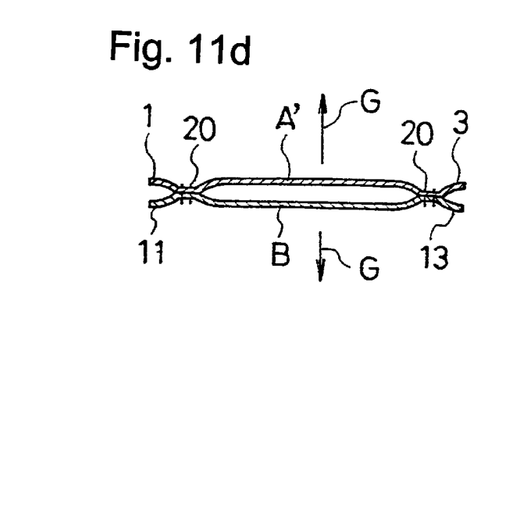

After superposing these panels A', B on each other along the sides 1f and 11, the sides 2 and 12, and the sides 3f and 13 each to each, the panels A', B are sewn up along the sides 1, 2, 3 and 11, 12, 13, as shown in FIGS. 11c and 11d. A numeral 20 designates a seam of the sewing. The sides 1r, 3r projecting from the sides 11, 13 are not sewn on the sides 11, 13. FIG. 11d is a sectional view taken along a line 11d—11d in FIG. 11c.

Then, the panels A', B of this sewn body are pulled in the directions of arrows G, G in FIG. 11d.

Figure 12A:
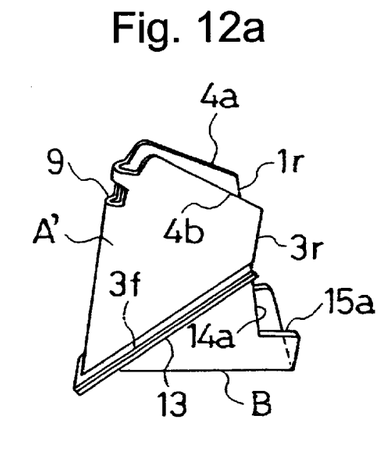
FIGS. 12a through 12f are views illustrating the process of sewing the airbag according to the second embodiment.
Figure 12B:
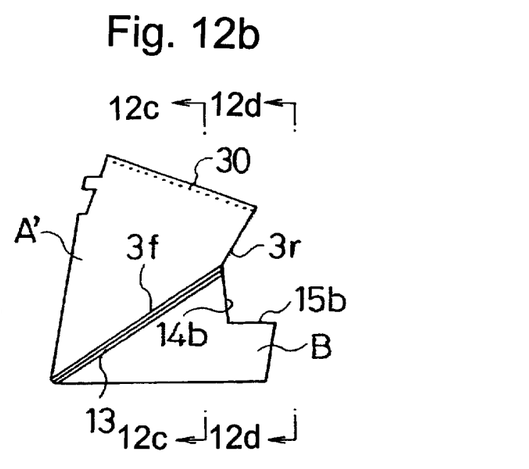
Figure 12C:
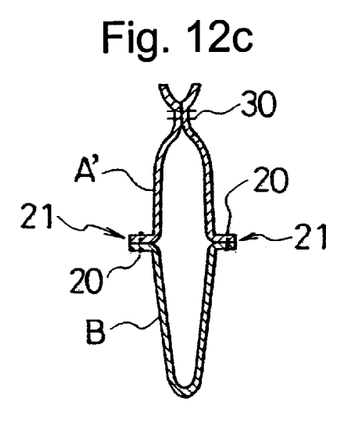
Figure 12D:
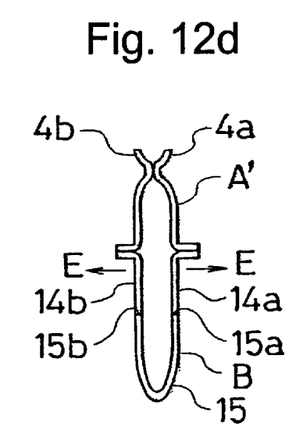
Figure 12E:
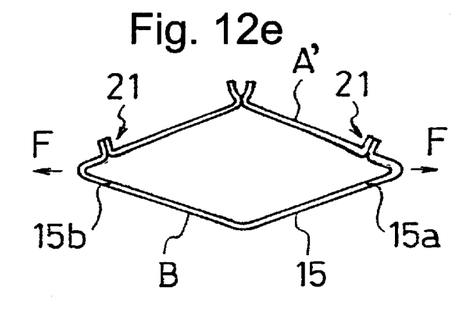
Figure 12F:
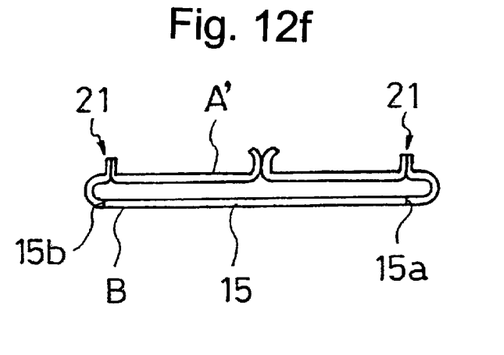
Figure 13:
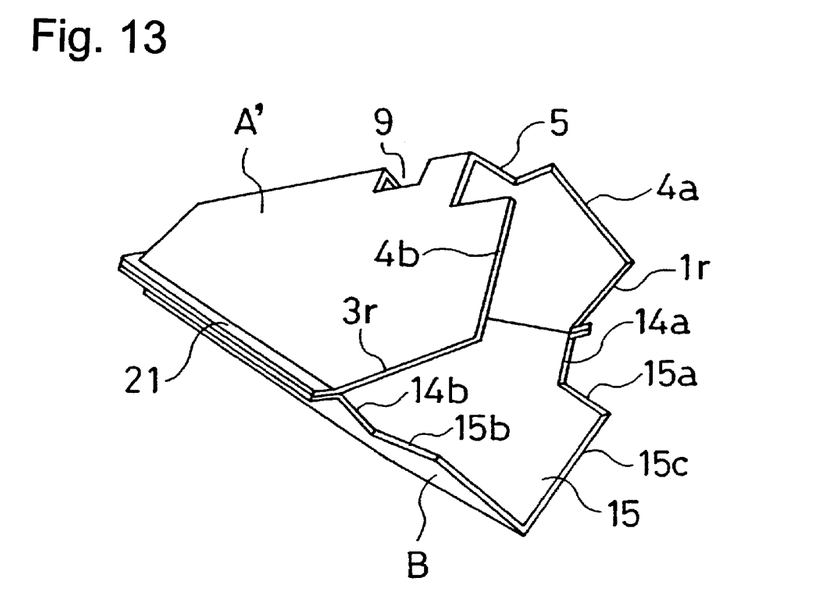
FIG. 13 is a view illustrating the process of sewing the airbag according to the second embodiment.
Figure 14:
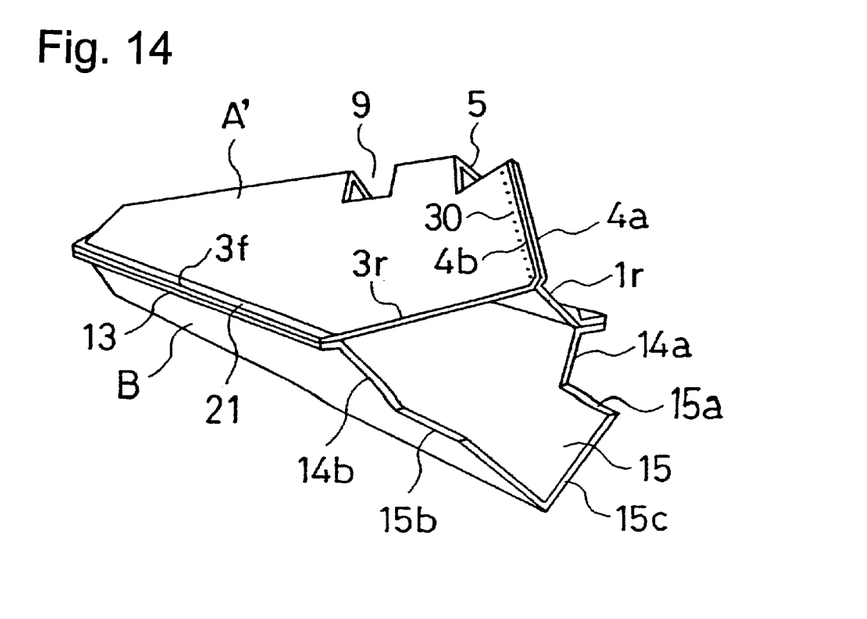
FIG. 14 is a view illustrating the process of sewing the airbag according to the second embodiment.
Figure 15:
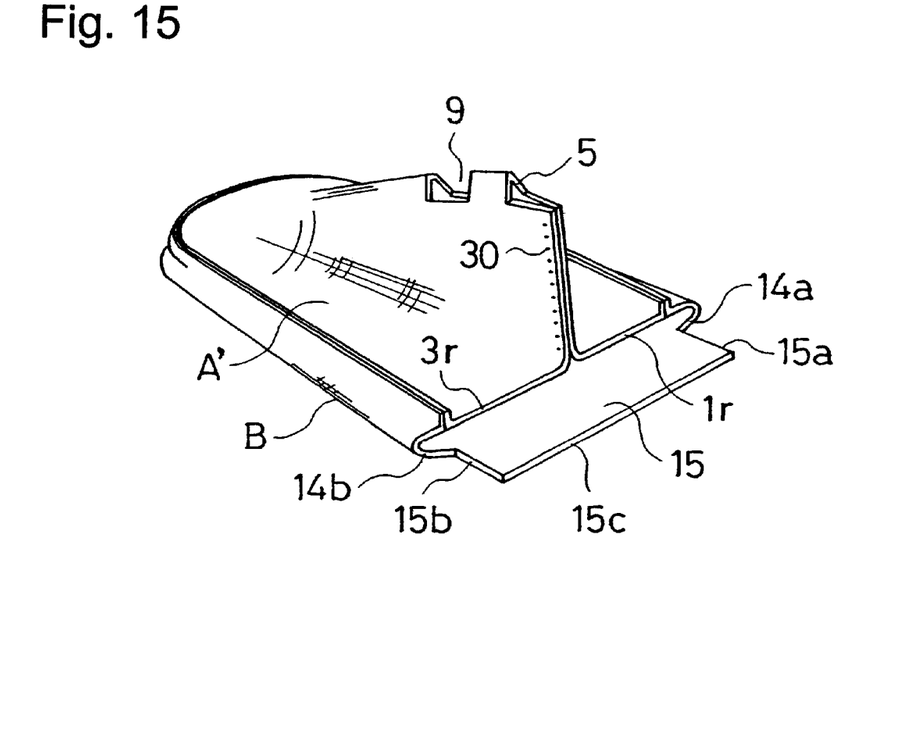
FIG. 15 is a view illustrating the process of sewing the airbag according to the second embodiment.

Accordingly, the panel A' is folded in two along the center line g thereof in FIG. 11c, and the sides 4a, 4b are superposed on each other as shown in FIG. 12a and FIG. 13. The panel B is also folded in two in the same manner along the center line g thereof. Accordingly, the protrusion 15 is also folded in two so that the sides 15a, 15b are superposed on each other and the sides 14a, 14b are also superposed on each other. In this state, portions along the sides 4a, 4b of the panel A' are sewn to each other as shown in FIG. 12b and FIG. 14. A numeral 30 designates a seam along the sides 4a, 4b. FIGS. 12c and 12d are sectional views taken along a line 12c—12c and a view taken along a line 12d—12d, respectively.

As shown in FIG. 12c, a sewn portion 21 by the seam 20 is disposed outside the sewn body.

After that, the panels A', B of this sewn envelope body are pulled in the directions of arrows E, E in FIG. 12d. After the body becomes in a state shown in FIG. 12e, it is further pulled in the directions of arrows F, F in FIG. 12e so as to become in the state shown in FIG. 12f and FIG. 15. As a result thereof, the sides 1r and 3r become linear.

Figure 16:
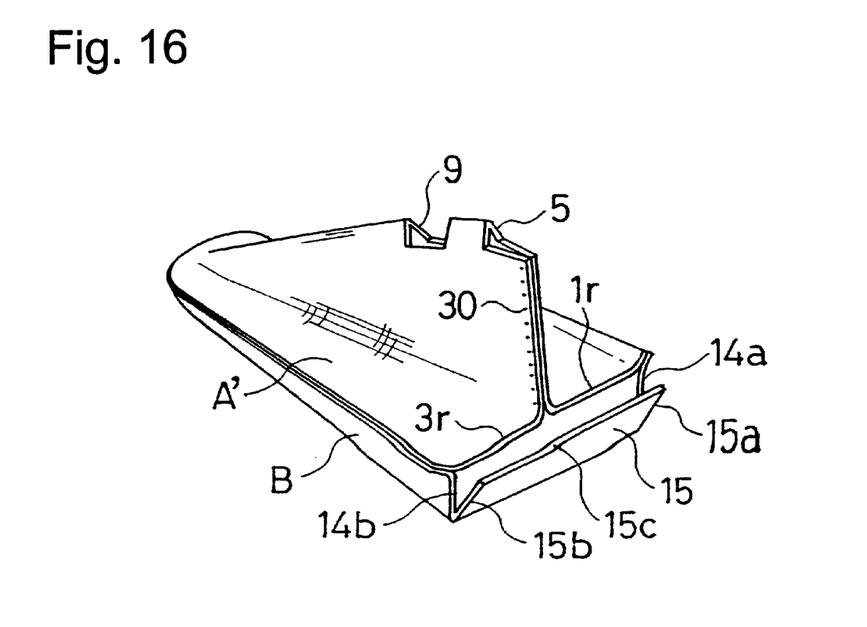
FIG. 16 is a view illustrating the process of sewing the airbag according to the second embodiment.

Then the side 15c of the protrusion 15 is sewn to the sides 1r, 3r of the panel A' by the seam 48 and the sides 15a and 14a are sewn to each other, and the sides 15b and 14b are sewn to each other by the seam 58, respectively.

Figure 17A:
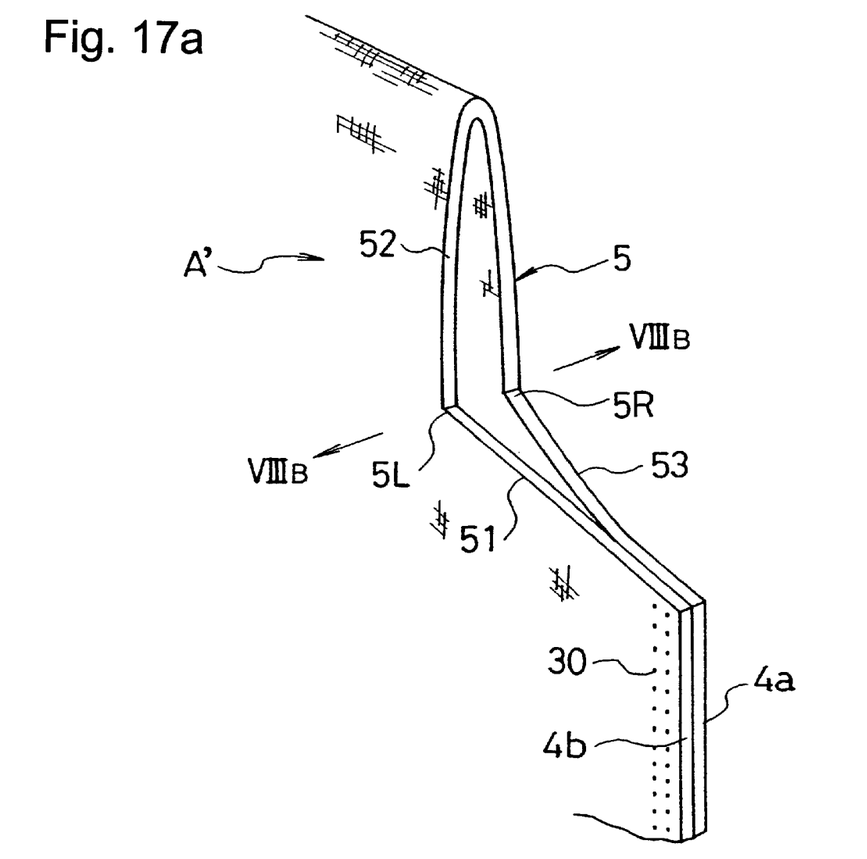
FIGS. 17a and 17b are views illustrating the process of sewing the airbag according to the second embodiment.
Figure 17B:
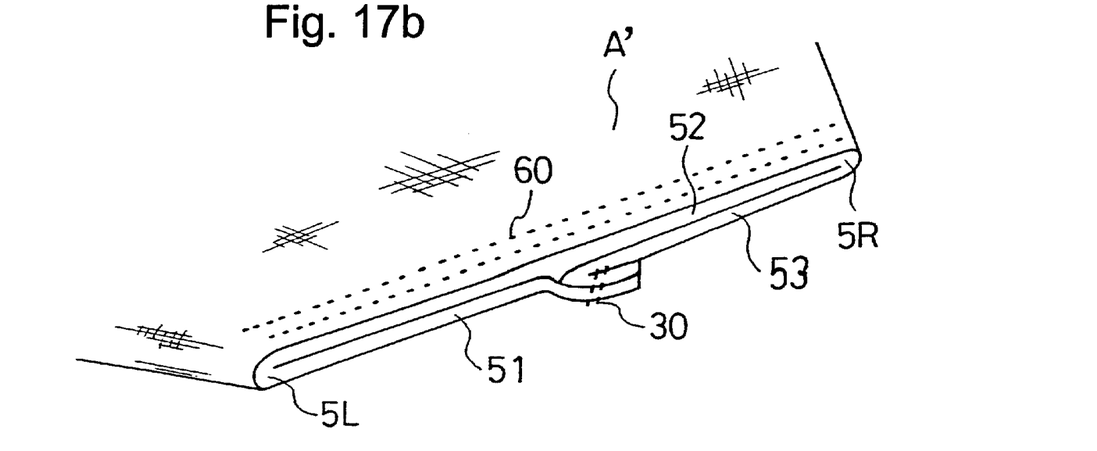

After that, the left and right corners 5L, 5R where the sides 51, 53 of the rectangular recess 5 intersect the side 52, respectively are pulled in the directions of arrows VIII$_B$, VIII$_B$ in such a manner as the former embodiment as shown in FIG. 17a. Then, the panel A' is sewn along these sides 51, 52 and 53 as shown in FIG. 17b. The numeral 60 designates the seam of the sewing.

Figure 18:
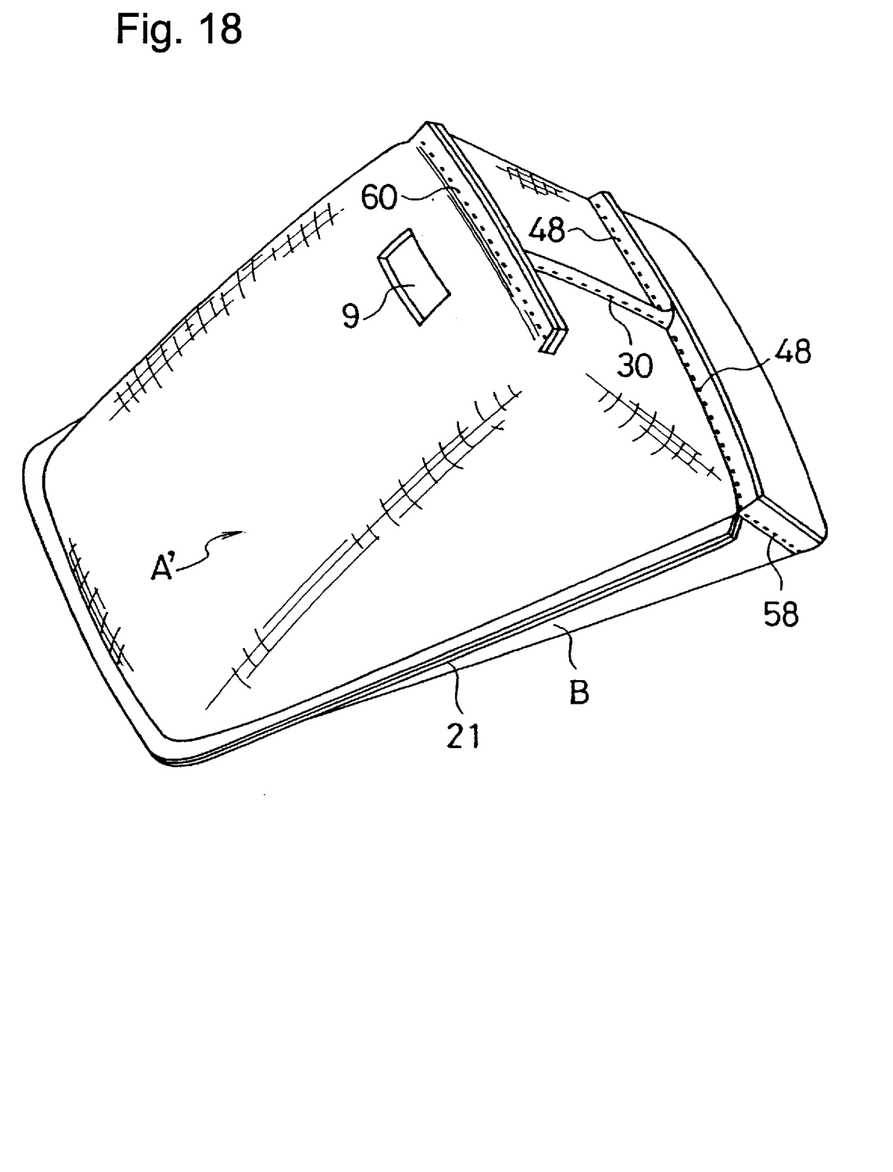
FIG. 18 is a perspective view of the sewn airbag according to the second embodiment.

In this way, an airbag is completed as shown in FIG. 18.

Because this airbag comprises only two pieces of panels A', B, and each of the sewn portions can be finished by the straight stitches, sewing work is easy. This airbag provides a large extent of thickness when inflated, such as obviously shown in FIG. 18.

Figure 19:
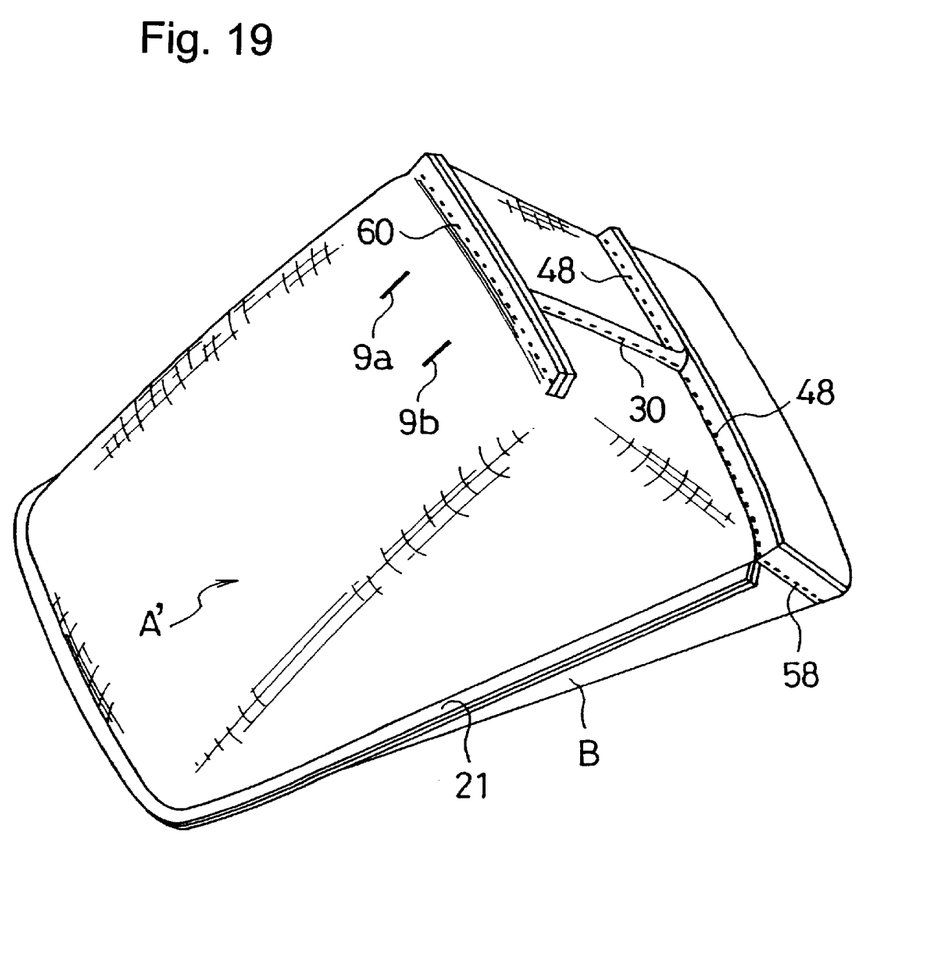
FIG. 19 is a perspective view of a sewn airbag according to the second embodiment.

In stead of the inlet 9, a pair of parallel slits 9a, 9b may be provided as shown in FIG. 19. By inserting a rod-shaped inflator in these slits 9a, 9b, the airbag can be connected to the inflator.

While the sewing process of this embodiment mentioned above is an example of producing the airbag of the present invention, other sewing process than the above may be employed in the present invention.

The airbag of the present invention is not only easy to be sewn, but also capable of providing a large extent of thickness when inflated, as mentioned above.

What is claimed is:

1. An airbag comprising first and second trapezoidal panels which are sewn together:

said first panel including a first side (2) corresponding to a top of the trapezoid, a second side (4) corresponding to a base of the trapezoid, and third and fourth sides (1) and (3) corresponding to oblique sides of the trapezoid, and having a rectangular recess (5) formed in a middle of the second side (4) and first and second protrusions (6a), (6b) protruding from portions of the third and fourth sides (1), (3) near the second side (4);

said second panel including a fifth side (12) corresponding to an upper side of the trapezoid, a sixth side (14) corresponding to a base of the trapezoid, and seventh and eighth sides (11), (13) corresponding to oblique sides of the trapezoid, and having a third protrusion (15) protruding from a middle of the sixth side (14);

said first and second protrusions (6a), (6b) of said first panel having lateral ninth and tenth sides (7a), (7b) continuously connected to the third and fourth sides (1), (3);

said second side (4) of said first panel having eleventh and twelfth sides (4a), (4b) on two sides of the rectangular recess (5);

said rectangular recess (5) having thirteenth and fourteenth sides (51), (53) continuously connected to said eleventh and twelfth sides (4a), (4b), and a fifteenth side (52) connecting said thirteenth and fourteenth sides (51) and (53);

said sixth side (14) of said second panel having sixteenth and seventeenth sides (14a), (14b) between two lateral eighteenth and nineteenth sides (15a), (15b) of the third protrusion (15) and the seventh and eighth sides (11), (13), respectively;

said first and second panels being sewn together along the third and seventh sides (1), (11), along the first and fifth sides (2), (12), and along the fourth and eighth sides (3), (13) by a first seam (20);

portions along the eleventh and twelfth sides (4a), (4b) of said first panel being sewn to each other by a second seam (30);

edges of the first and second protrusions (6a), (6b) of said first panel and an edge of the third protrusion (15) of said second panel being sewn to each other by a third seam (40);

portions along the lateral ninth side (7a) of said first panel and the eighteenth side (15a) and a portion along the sixteenth side (14a) of said second panel being sewn to each other by a fourth seam (50);

portions along the tenth side (7b) of said first panel and the nineteenth side (15b) and a portion along the seventeenth side (14b) of said second panel being sewn to each other by the fourth seam (50); and portions along the thirteenth and fourteenth sides (51), (53) and a portion along the fifteenth side (52) of the rectangular recess (5) of said first panel being sewn to each other by a fifth seam (60).

2. The airbag as claimed in claim 1, wherein said first panel includes an opening for introducing a gas therethrough or a pair of slits for inserting an inflator therethrough in a vicinity of the rectangular recess (5) of the first panel.

3. The airbag as claimed in claim 1, wherein said airbag is for a passenger's seat.

4. An airbag comprising first and second trapezoidal panels and which are sewn together:

said first panel including a first side (2) corresponding to a top of the trapezoid, a second side (4) corresponding to a base of the trapezoid, and third and fourth sides (1) and (3) corresponding to oblique sides of the trapezoid, and having a rectangular recess (5) formed in a middle of the second side (4);

said second panel including a fifth side (12) corresponding to an upper side of the trapezoid, a sixth side (14) corresponding to a base of the trapezoid, and seventh and eighth sides (11), (13) corresponding to oblique sides of the trapezoid, and having a protrusion (15) protruding from a middle of the sixth side (14);

said protrusion (15) having ninth and tenth sides (15a), (15b) continuously connected to the sixth side (14), and an eleventh side (15c) connecting said ninth and tenth sides (15a), (15b);

the third side (1) of the first panel having a twelfth side (1f) superposed on the seventh side (11) of the second panel and a thirteenth side (1r) extending from said twelfth side (1f);

the fourth side (3) of the first panel having a fourteenth side (3f) superposed on the eighth side (13) of the second panel and a fifteenth side (3r) extending from said fourteenth side (3f);

said second side (4) of said first panel having sixteenth and seventeenth sides (4a), (4b) on two sides of the rectangular recess (5);

said rectangular recess (5) having eighteenth and nineteenth sides (51), (53) continuously connected to said sixteenth and seventeenth sides (4a), (4b), and a twentieth side (52) connecting said eighteenth and nineteenth sides (51) and (53);

said sixth side (14) of said second panel having twenty-first and twenty-second sides (14a), (14b) between the two lateral ninth and tenth sides (15a), (15b) of the protrusion (15) and the seventh and eighth sides (11), (13), respectively;

said first and second panels being sewn together along the twelfth and seventh sides (1f), (11), along the first and fifth sides (2),(12), and along the fourteenth and eighth sides (3f), (13) by a first seam (20);

portions along the sixteenth and seventeenth sides (4a), (4b) of said first panel being sewn to each other by a second seam (30);

a portion along the ninth side (15a) of said second panel and a portion along the twenty-first side (14a) of said second panel being sewn to each other by a third seam (58);

a portion along the tenth side (15b) of said second panel and a portion along the twenty-second side (14b) of said second panel being sewn to each other by the third seam (58);

portions along the thirteenth and fifteenth sides (1r), (3r) of said first panel and a portion along the eleventh side (15c) of said second panel being sewn to each other by a fourth seam (48); and portions along the eighteenth and nineteenth sides (51), (53) and a portion along the twentieth side (52) of the rectangular recess (5) of said first panel being sewn to each other by a fifth seam (60).

* * * * *